United States Patent
Shimura et al.

(10) Patent No.: US 7,599,081 B2
(45) Date of Patent: Oct. 6, 2009

(54) DETECTING AND PROTECTING A COPY GUARDED DOCUMENT

(75) Inventors: Hiroshi Shimura, Kanagawa (JP); Guan Haike, Kanagawa (JP); Masaaki Ishikawa, Tokyo (JP); Takashi Saitoh, Tokyo (JP); Hiroshi Arai, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 585 days.

(21) Appl. No.: 11/298,615

(22) Filed: Dec. 12, 2005

(65) Prior Publication Data

US 2006/0126098 A1    Jun. 15, 2006

(30) Foreign Application Priority Data

Dec. 13, 2004    (JP)    .............................. 2004-360006

(51) Int. Cl.
    *G06K 15/00*    (2006.01)
(52) U.S. Cl. ...................................... 358/1.14; 358/448
(58) Field of Classification Search .................. 358/1.1, 358/1.9, 1.14, 400, 401, 448, 450, 468; 382/135
    See application file for complete search history.

(56) References Cited

U.S. PATENT DOCUMENTS

| 5,781,653 | A | * | 7/1998 | Okubo | ........................ 382/135 |
| 6,473,194 | B1 | * | 10/2002 | Sakai | ........................ 358/1.17 |
| 2002/0196465 | A1 | | 12/2002 | Ohta | |
| 2005/0041263 | A1 | | 2/2005 | Ishikawa et al. | |
| 2005/0141015 | A1 | * | 6/2005 | Fusayuki | ................... 358/1.14 |
| 2005/0151989 | A1 | | 7/2005 | Shimura et al. | |
| 2005/0151990 | A1 | | 7/2005 | Ishikawa et al. | |

FOREIGN PATENT DOCUMENTS

| EP | 1385327 | 1/2004 |
| JP | H05-091294 | 4/1993 |
| JP | H07-036317 | 2/1995 |
| JP | H08-007100 | 1/1996 |
| JP | 2873220 | 1/1999 |
| JP | 11032213 | 2/1999 |
| JP | 2904492 | 3/1999 |
| JP | 3078433 | 6/2000 |
| JP | 2004-056266 | 2/2004 |
| JP | 2004-110618 | 4/2004 |
| JP | 2004-110250 | 8/2004 |
| JP | 2004-274092 | 9/2004 |
| WO | WO 2005022896 | 3/2005 |

OTHER PUBLICATIONS

Chinese Office Action for corresponding Chinese Patent Application No. 2005101317081 with English translation.

* cited by examiner

*Primary Examiner*—Thomas D Lee
(74) *Attorney, Agent, or Firm*—Dickstein Shapiro LLP (57) ABSTRACT

A detection result indicating whether a document image is copy guarded is generated. Based on the detection result, information contained in the document image is concealed.

26 Claims, 5 Drawing Sheets

DETECTING AND PROTECTING A COPY GUARDED DOCUMENT

This patent application is based on and claims priority to Japanese patent application No. 2004-360006 filed on Dec. 13, 2004, in the Japanese Patent Office, the entire contents of which are hereby incorporated by reference.

FIELD OF THE INVENTION

The following disclosure relates generally to an apparatus, method, system, computer program and product, capable of detecting a copy guarded document. The following disclosure further relates generally to an apparatus, method, system, computer program and product, capable of protecting a copy guarded document.

DESCRIPTION OF THE RELATED ART

Recent image processing apparatuses, such as copiers or printers, have a function of prohibiting output of a copy guarded document.

In one example, a monetary document such as a paper currency or a security may be prohibited from being reproduced. Once an input document is recognized as a monetary document, for example, based on a detection result indicating whether a pattern or mark specific to the monetary document is present, reproduction of the input document may be prohibited, as described in Japanese Patent No. 2904492 or 2873220, for example. Alternatively, information contained in the input document may be changed or concealed when the input document is output, as described in Japanese Patent Laid-Open Publication No. H08-7100 or H05-91294, for example.

In another example, a confidential document having confidential information may be prohibited from being reproduced. Once an input document is recognized as a confidential document, for example, based on a detection result indicating whether a pattern or mark specific to the confidential document is present, reproduction of the input document may be prohibited, as described in Japanese Patent No. 3078433 or Japanese Patent Laid-Open Publication No. H07-36317, for example. Alternatively, information contained in the input document may be changed or concealed when the input document is output.

In addition to the above-described function of prohibiting output of the copy guarded document, the recent image processing apparatuses may have a function of outputting an input document in various ways, as a printed document, a faxed document, electronic data for storage, electronic data for distribution, etc. Thus, a detection result indicating whether an input document is copy guarded may differ depending on a specific application of the input image.

BRIEF SUMMARY OF THE INVENTION

Exemplary embodiments of the present invention includes an apparatus, method, system, computer program and product, capable of detecting whether a document image is copy guarded at a detection time point, which occurs before applying specific image processing to the document image.

Other exemplary embodiments of the present invention include an apparatus, method, system, computer program and product, capable of protecting a copy guarded document image by adding a conceal pattern to the copy guarded document image at an addition time point, which occurs before applying output processing to the copy guarded document image.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE INVENTION

In describing the exemplary embodiments illustrated in the drawings, specific terminology is employed for clarity. However, the disclosure of this patent specification is not intended to be limited to the specific terminology selected and it is to be understood that each specific element includes all technical equivalents that operate in a similar manner. Referring now to the drawings, wherein like reference numerals designate identical or corresponding parts throughout the several views, FIG. 1 illustrates an image processing apparatus 1 according to an exemplary embodiment of the present invention.

Figure 1:
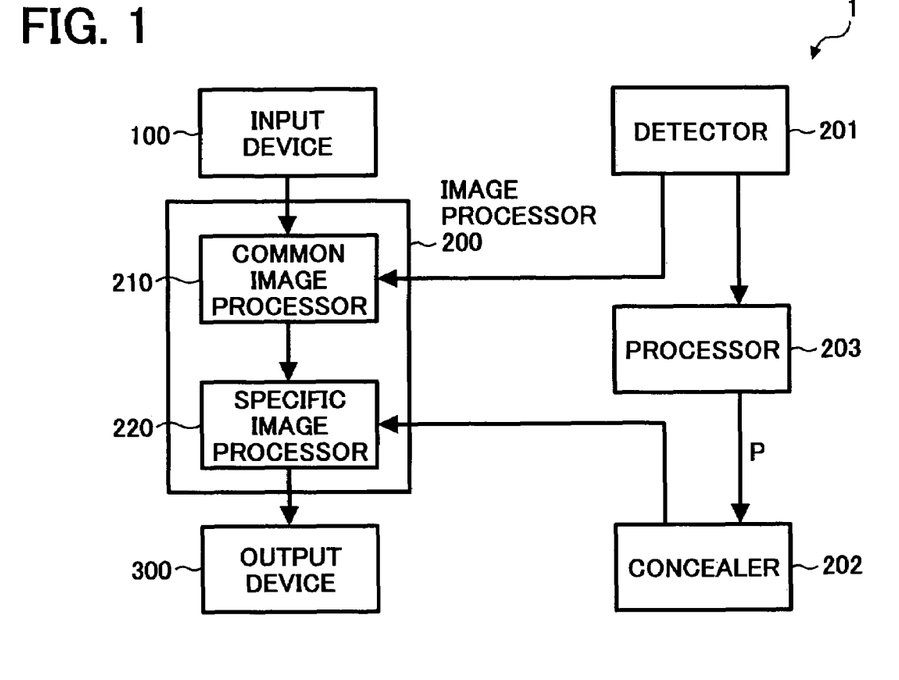
FIG. 1 is a schematic block diagram illustrating the structure of an image processing apparatus according to an exemplary embodiment of the present invention.

As shown in FIG. 1, the image processing apparatus 1 includes an input device 100, an image processor 200, an output device 300, a detector 201, a processor 203, and a concealer 202.

The processor 203 includes any kind of processor capable of controlling operation of the image processing apparatus 1 according to an instruction ("user instruction") received from a user. In this example, the user instruction may be used to select an application of the document image from a plurality of applications, each of which indicates how the document image is output. For example, the applications may indicate whether to output the document image as a printed document image, a faxed document image, electronic data for storage, or electronic data for distribution. Upon receiving the user instruction, the processor 203 causes the image processing apparatus 1 to perform an operation according to the application corresponding to the user instruction.

The input device 100 inputs a document image to be processed. For example, the input device 100 obtains a document image, and preferably applies various input processing to the document image. The input processing may be common to all applications.

The image processor 200 applies various image processing to the document image processed by the input device 100. As shown in FIG. 1, the image processor 200 mainly includes a common image processor 210 and a specific image processor 220. The common image processor 210 applies various common image processing, which is common to all applications. The specific image processor 220 applies various specific image processing, which is specific to each application.

The output device 300 outputs the document image. For example, the output device 300 obtains the document image processed by the image processor 200, and preferably applies various output processing to the document image. The output processing may differ depending on a specific application. The output device 300 further outputs the document image according to the application determined by the user instruction.

In this example, the user may further instruct the image processing apparatus 1 to detect whether the document image is copy guarded to generate a detection result, and protect the copy guarded document image based on the detection result.

More specifically, the detector 201 detects whether the document image is copy guarded, for example, by detecting whether the document image includes a pattern or mark specific to the copy guarded document (the "copy guard pattern") to generate a detection result. The detection result is then provided to the processor 203.

In this example, the detector 201 detects whether the document image is copy guarded at a point in time before the specific image processor 220 applies specific image processing to the document image. More preferably, the detector 201 detects whether the document image is copy guarded at a point in time after the input device 100 applies input processing to the document image but before the specific image processor 220 applies specific image processing to the document image. For example, as illustrated in FIG. 1, the detector 201 may detect whether the document image is copy guarded while the document image is being processed by the common image processor 210.

The concealer 202 protects the document image according to the detection result obtained from the processor 203. In this example, if the detection result indicates that the document image is copy guarded, the concealer 202 obtains a conceal pattern P from the processor P, which is selected by the processor 203 according to the application determined by the user instruction. The concealer 202 adds the conceal pattern P to the document image to conceal information contained in the document image from the user. If the detection result indicates that the document is not copy guarded, no conceal pattern is added.

Preferably, in this example, the concealer 202 adds the conceal pattern P at a point in time before the output device 300 applies output processing to the document image. More preferably, the concealer 202 adds the conceal pattern P at a point in time after the common image processor applies common image processing to the document image but before the output device 300 applies output processing to the document image. For example, as illustrated in FIG. 1, the concealer 202 may add the conceal pattern P while the document image is being processed by the specific image processor 220.

Figure 2:
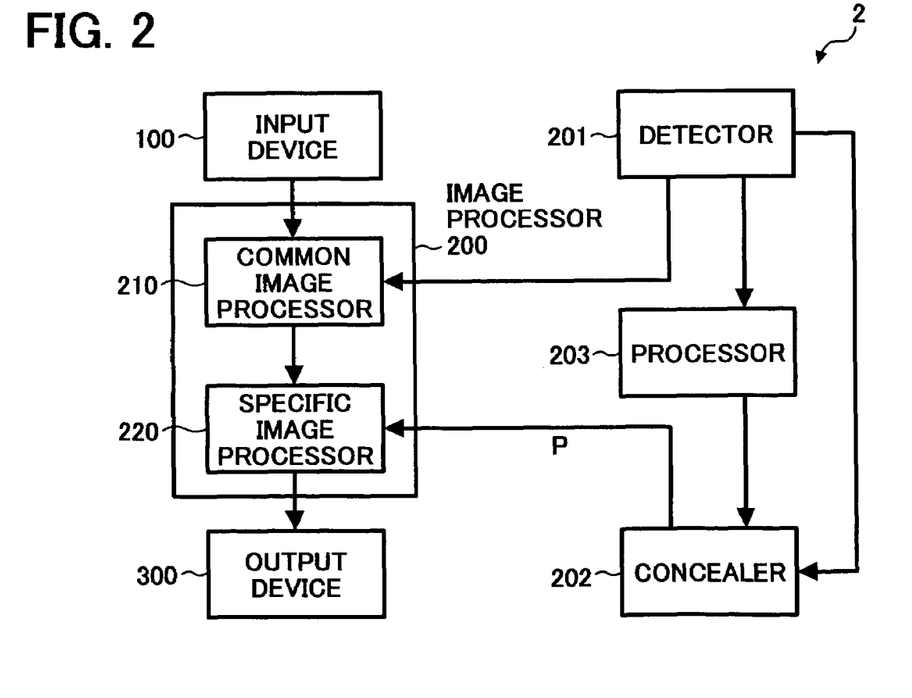
FIG. 2 is a schematic block diagram illustrating the structure of an image processing apparatus according to an exemplary embodiment of the present invention.

Referring now to FIG. 2, an image processing apparatus 2 is explained according to another exemplary embodiment of the present invention. The image processing apparatus 2 of FIG. 2 is substantially similar to the image processing apparatus 1 of FIG. 1. The differences between apparatus 2 and apparatus 1 include the use of detection result and the use of conceal pattern P.

More specifically, in this example, the detection result generated by the detector 201 is output directly to the concealer 202. Further, in this example, the concealer 202 selects a conceal pattern P according to the application determined by the user instruction.

Figure 3:
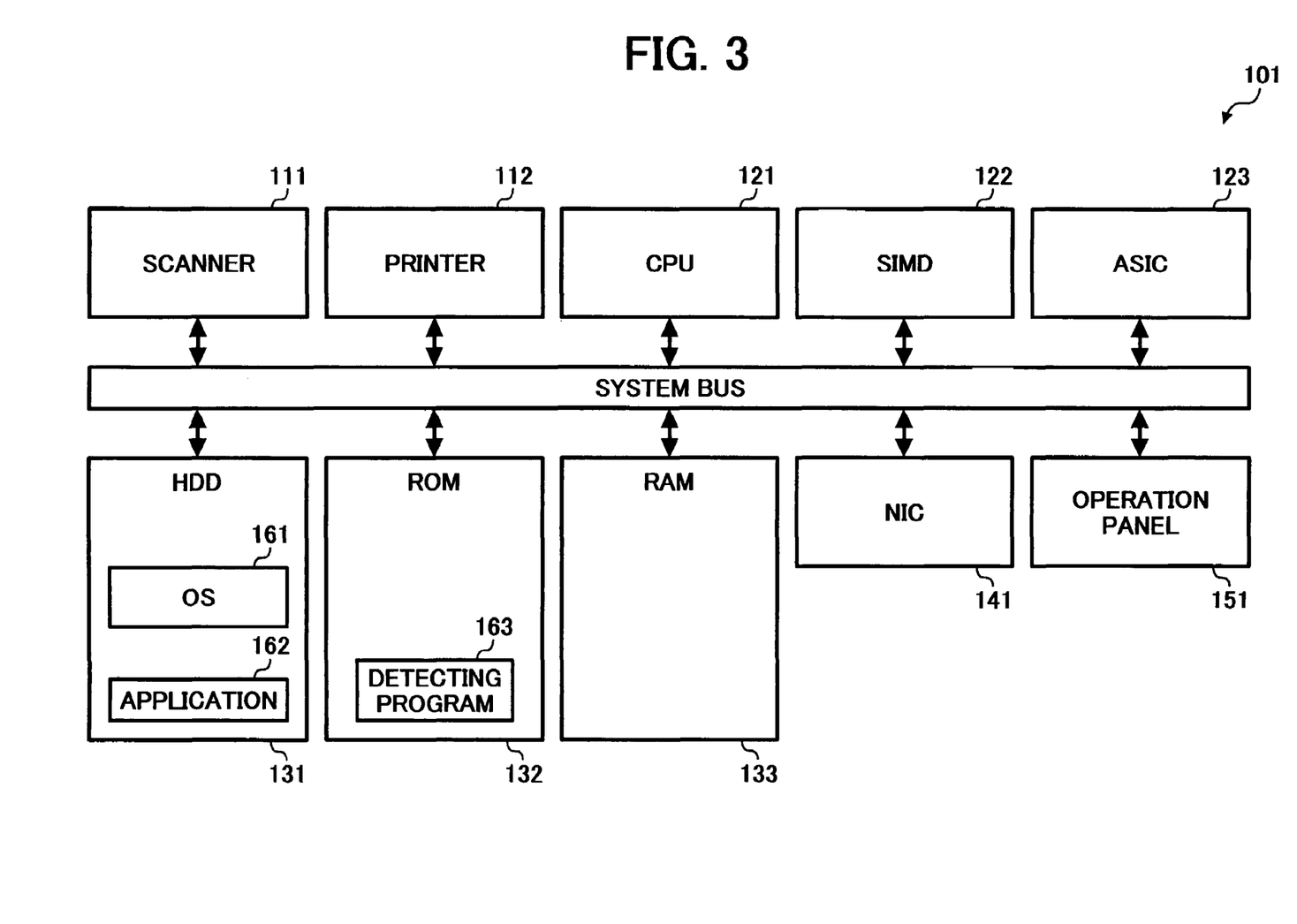
FIG. 3 is a schematic block diagram illustrating the structure of a multifunctional apparatus according to an exemplary embodiment of the present invention.

The image processing apparatus 1 or 2 may be implemented in various ways, for example, as a multifunctional apparatus (MFP) 101 shown in FIG. 3.

The MFP 101 provides various functions including copying, printing, scanning, faxing, and sending data via network. As shown in FIG. 3, the MFP 101 includes a scanner 111, a printer 112, a central processing unit (CPU) 121, a single instruction multiple data (SIMD) processor 122, an application specific integrated circuit (ASIC) 123, a hard disk drive (HDD) 131, a read only memory (ROM) 132, a random access memory (RAM) 133, a network interface card (NIC) 141, and an operation panel 151, which are connected via a system bus.

The scanner 111 includes any kind of device capable of scanning a printed document image into a document image. The printer 112 includes any kind of device capable of printing a document image as a printed document image.

The CPU 121 includes any kind of processor allowing the MFP 101 to process information. The SIMD 122 includes any kind of processor allowing the MFP 101 to concurrently perform a plurality of operations. The ASIC 123 includes any kind of integrated circuit capable of performing various image processing.

The HDD 131 includes any kind of storage capable of storing a large amount of data. As shown in FIG. 3, the HDD 131 stores any kind of operating system (OS) 161, such as UNIX, for example. Further, the HDD 131 stores various application programs 162, each of which may be activated when performing a specific function. For example, the HDD 131 may store a printer application program for performing the printing function, a fax application program for performing the faxing function, a storage application program for performing the storing function, a mail application program for performing the email function, etc.

The ROM 132 includes any kind of nonvolatile memory. In this example, as shown in FIG. 3, the ROM 132 stores a detecting program 163 used for detecting whether the document image is copy guarded. In this example, the detecting program 163 provides the function of concealing information contained in the document image when the document image is copy guarded, however, such function may be provided separately, for example, as a concealing program. The RAM 133 includes any kind of volatile memory, which may function as a working area of the CPU 121.

The NIC 141 includes any kind of device allowing the MFP 101 to communicate with any other device or apparatus via network, for example.

The operation panel 151 includes any kind of user interface, which inputs data received from a user or outputs data to the user. In this example, the user may input a user instruction, which determine a specific application of the document image, through the operation panel 151.

Figures 4, 4A:
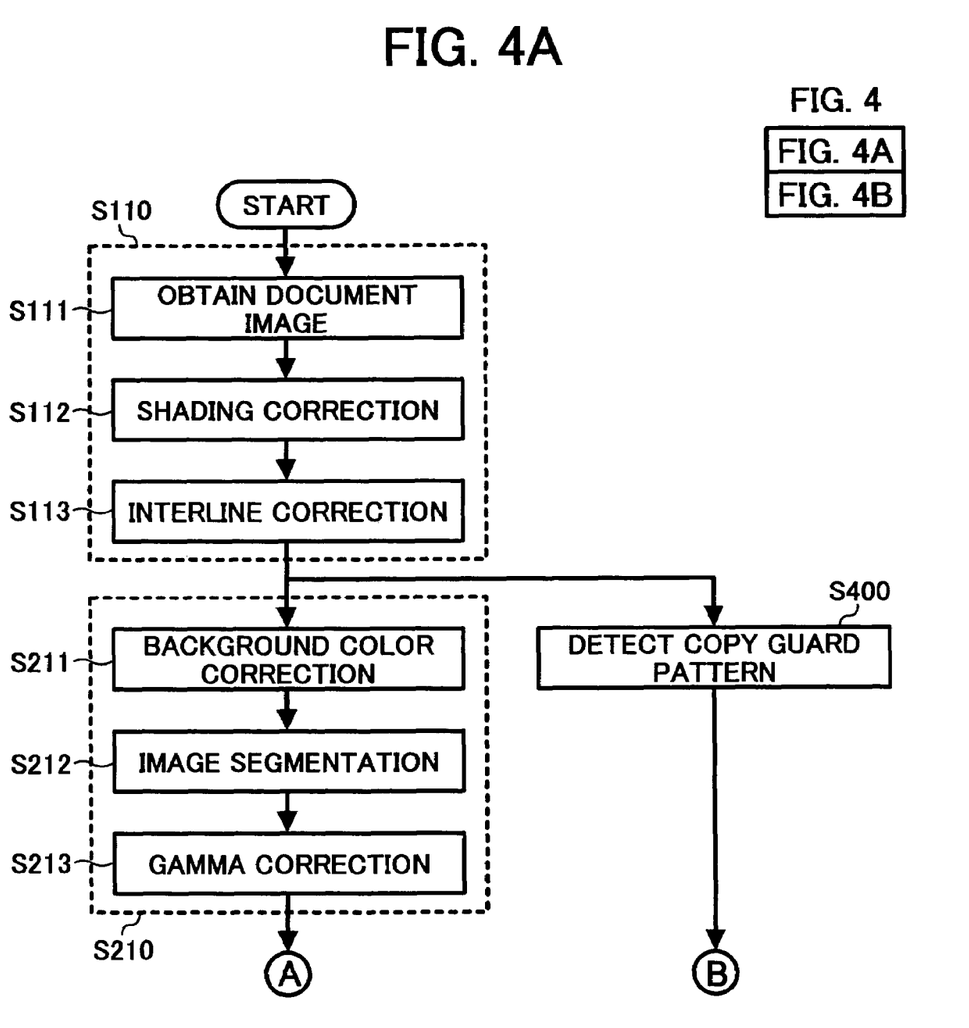
FIGS. 4A and 4B are flowcharts illustrating operation of detecting a copy guarded document image according to an exemplary embodiment of the present invention.
Figure 4B:
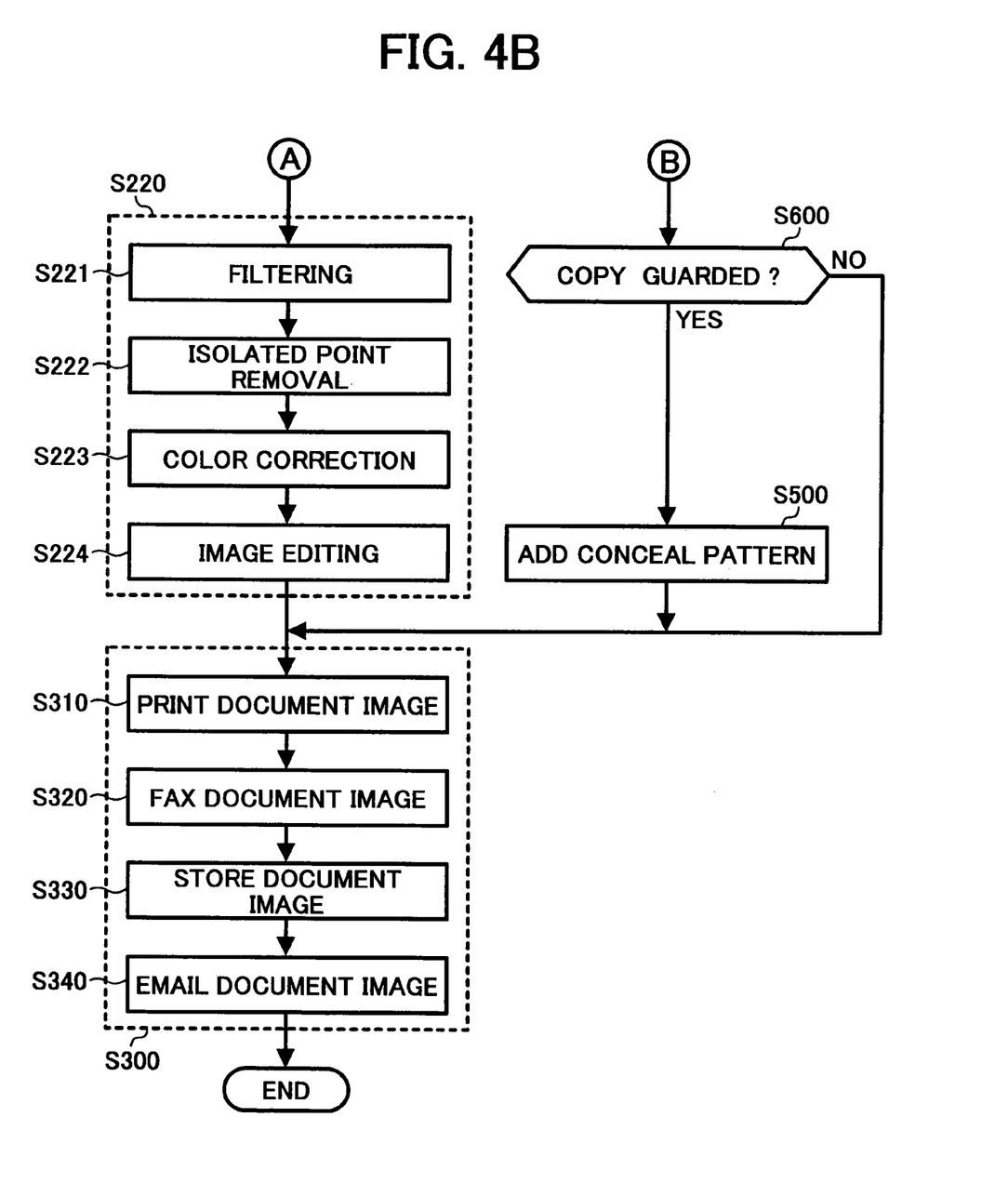

Referring now to FIGS. 4A and 4B, the operation of detecting a copy guarded document image, performed by the MFP 101, is explained according to an exemplary embodiment of the present invention.

In Steps S111, S112, and S113, the scanner 111 obtains a document image, and applies various input processing to the document image, which is common to all applications. Steps S111, S112, and S113 may be collectively referred to as a Step S110 of inputting a document image.

More specifically, in Step S111, the scanner 111 obtains a document image, for example, by scanning a printed document image into electronic data. In Step S112, the scanner 111 applies shading correction to the document image to correct shading in the document image. In Step S113, the scanner 111 applies interline correction to the document image to correct misalignment among the reading positions of different color components, if the document image is a color image.

In Step S211, S212 and S213, the ASIC 123 applies various common image processing to the document image processed by the scanner 111. As described above referring to FIG. 1 or 2, common image processing is common to all applications. Steps S211, S212, and S213 may be collectively referred to as a Step S210 of applying common image processing to the document image.

More specifically, in Step S211, the ASIC 123 corrects background color of the document image. In Step S212, the ASIC 123 segments the document image into a plurality of sections according to characteristics of the document image. For example, the document image may be segmented into a foreground section having a plurality of characters and a background section other than the foreground section. In Step S213, the ASIC 123 applies gamma correction to the document image.

As illustrated in FIG. 4A, a Step S400 of detecting whether the document image is copy guarded may be performed when Step S211 is being performed. In this example, the SIMD 122, which is activated by the detecting program 163, detects whether the document image includes a copy guard pattern to generate a detection result, for example, in the following procedure.

The SIMD 122 extracts a portion of the document image, having a predetermined size. The SIMD 122 obtains a copy guard pattern, which may be previously stored in the HDD 131. The SIMD 122 determines whether the extracted portion includes the copy guard pattern. If the copy guard pattern is included, the detection result having the value 1 is generated. If the copy guard pattern is not included, the detection result having the value 0 is generated. The detection result may be stored in the RAM 133.

Referring to FIG. 4B, in Steps S221, S222, S223, and S224, the ASIC 123 applies various specific image processing to the document image. As described above referring to FIG. 1 or 2, specific image processing differs depending on a specific application of the document image. Steps S221, S222, S223, and S224 may be collectively referred to as a Step S220 of applying specific image processing to the document image.

More specifically, in Step S221, the ASIC 123 applies filtering, such as smoothing or enhancing, to the document image. In Step s222, the ASIC 213 removes any isolated point from the document image. In Step S223, the ASIC 213 corrects color of the document image. In Step S224, the ASIC 214 applies image editing, such as mirroring, enlarging, or reducing, to the document image.

The specific image processing performed in Step S220 may differ depending on a specific application of the document image, which may be determined by the user instruction input through the operation panel 151. For example, in Step S223, if the document image is subject to be printed, the ASIC 213 converts the document image from RGB (Red, Green and Blue) to CMYK (Cyan(blue), Magenta(red), Yellow and Black). In another example, in Step S223, if the document image is subject to be stored or sent via email, no such conversion is performed on the RGB document image.

As illustrated in FIG. 4B, a Step S600 of determining whether the document image is copy guarded may be performed at any point in time between Steps S400 and S500.

In one example, the CPU 121 may obtain the detection result generated in Step S400, and determines whether the detection result has the value 1 or 0. If the detection result has the value 1, the operation proceeds to Step S500. Otherwise, the operation proceeds to Step S300 to output the document image without adding a conceal pattern. Once the detection result is obtained by the CPU 121, the CPU 121 may notify the user of the detection result, for example, by displaying the detection result on the operation panel 151, sending the detection result to an email account of the user, generating an alarm sound corresponding to the detection result, lighting an alarm lamp corresponding to the detection result, etc.

In another example, the ASIC 123 may obtain the detection result generated in Step S400, and determines whether the detection result has the value 1 or 0. If the detection result has the value 1, the operation proceeds to Step S500. Otherwise, the operation proceeds to Step S300 to output the document image without concealing any information. In this exemplary case, the detection result is not provided to the user, thus suppressing an amount of information the user can obtain from the document image.

Still referring to FIG. 4B, the Step S500 of adding a conceal pattern may be performed when Step S224 is being performed. At this time, any one of the CPU 121 or the ASIC 123 may select a conceal pattern suitable for the application or characteristics of the document image, from a plurality of conceal patterns stored in the HDD 131.

For example, if the document image is subject to be printed as a color document image having the CMYK format, a conceal pattern for the CMYK document image is selected. If the document image is subject to be stored or sent via email as color data having the RGB format, a conceal pattern for the RGB document image is selected. If the document image is subject to be faxed as monochrome faxed data, a conceal pattern for the monochrome document image is selected.

Still referring to FIG. 4B, in any one of Step S310, S320, S330, and S340, the ASIC 123 applies output processing to the document image. As described above referring to FIG. 1 or 2, output processing differs depending on a specific application of the document image. Any one of Steps S310, S320, S330, S340 may be referred to as Step S300 of outputting a document image.

For example, if the document image is subject to be printed, the operation proceeds to S310 to print the document image as a printed document image. More specifically, halftone processing may be applied to the document image, and printed by the printer 112. Step S310 of printing is asynchronous to Step S110 of inputting.

If the document image is subject to be faxed, the operation proceeds to Step S320 to fax the document image as faxed data. More specifically, the document image may be encoded into faxed data. The faxed data is then sent through the NIC 141 via the network, such as a public switched telephone network, for example. The Step S320 of faxing is asynchronous to the Step S110 of inputting.

If the document image is subject to be stored, the operation proceeds to Step S330 to store the document image as electronic data. More specifically, the document image may be compressed and stored in the HDD 131. Step S330 of storing is asynchronous to Step S110 of inputting.

If the document image is subject to be sent via email, the operation proceeds to Step S340 to send the document image as email data. More specifically, the document image may be compressed into email data, and sent to a destination through the NIC 141 via the network, such as the Internet. Step S340 of emailing is asynchronous to Step S110 of inputting.

In this example, since the Step S400 of detecting whether a document image is copy guarded is performed at a point in time before the Step S220 of applying specific image processing to the document image, the detection result can be treated substantially in the same manner for all applications.

Further, in this example, since the Step S500 of adding a conceal pattern is performed at a point in time before the Step S300 of outputting the document image, the conceal pattern can be added substantially in the same manner for all applications. For example, if the conceal pattern is added when the output processing is being applied to the document image, the amount of information concealed may differ depending on a specific application of the document image. This is partly because the Step S300 of outputting is asynchronous to the Step S110 of inputting.

Furthermore, the processing speed may be controlled based on a specific time point in which Step S400 or Step S500 is performed.

Furthermore, the amount of information being concealed in the document image may be controlled based on a specific time point in which Step S400 or Step S500 is performed.

Figure 5:
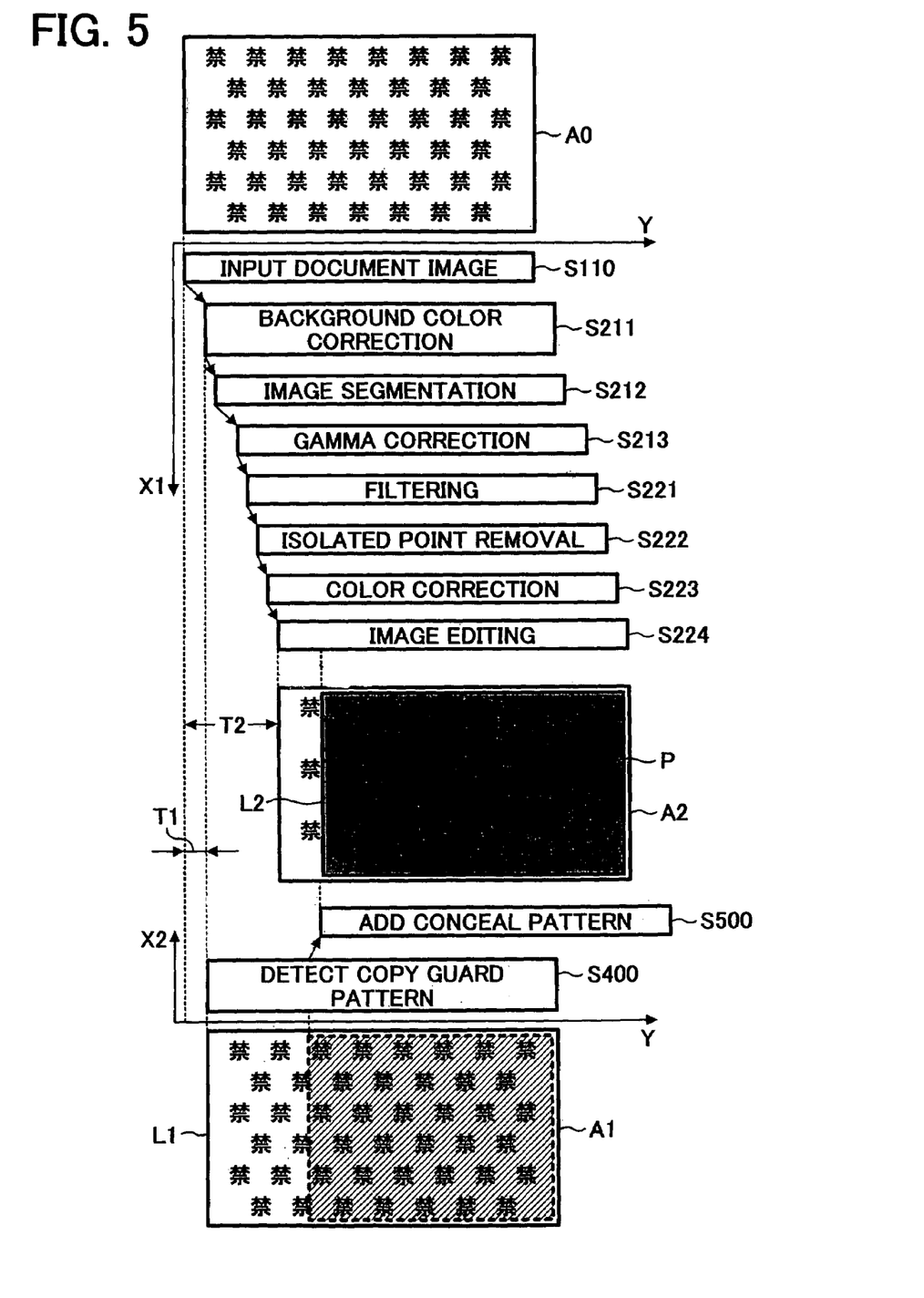
FIG. 5 is an illustration for explaining operation of detecting a copy guarded document image according to an exemplary embodiment of the present invention.

Referring now to FIG. 5, the operation for detecting a copy guarded document image is now explained. The steps illustrated in FIG. 5 may be performed by the MFP 101 in a substantially similar manner as described above referring to FIGS. 4A and 4B. In this example, a document image A0 having a plurality of copy guard patterns is processed.

Referring to FIG. 5, each step arranged along the vertical line X1 corresponds to image processing applied to the document image A0. As described above referring to FIG. 4A or 4B, Step S110 inputs the document image A0 to be processed. Step S211 applies background color correction in synchronization with Step S110. Step S212 performs image segmentation in synchronization with Step S110. Step S213 performs gamma correction in synchronization with Step S110. Step S221 performs filtering in synchronization with Step S110. Step S222 removes an isolated point in synchronization with Step S110. Step S223 corrects color in synchronization with Step S110. Step S224 performs editing in synchronization with Step S110.

Still referring to FIG. 5, the steps arranged along the vertical line X2 includes Step S400 of detecting whether the document image A0 is copy guarded, and Step S500 of adding a conceal pattern P to the document image A0.

As described above referring to FIG. 4A or 4B, Step S400 detects whether the document image A0 is copy guarded in synchronization with Step S110. For example, as illustrated in FIG. 5, the SIMD 122 may extract a portion A1 from the document image A0, and search for the copy guard pattern. If the number of copy guard patterns is equal to or greater than a predetermined number, the SIMD 122 generates a detection result indicating that the document image A0 is copy guarded. Otherwise, the SIMD 122 generates a detection result indicating that the document image A0 is not copy guarded.

When the detection result indicates that the document image A0 is copy guarded, Step S500 adds a conceal pattern P in synchronization with Step S110. As a result, a document image A2 having the conceal pattern P may be generated as illustrated in FIG. 5.

For example, as illustrated in FIG. 5, if the document image A0 is monochrome, a conceal pattern P for the monochrome document image may be added to the monochrome image.

In another example, if the document image A0 is color, a conceal pattern P may be added to each of the document images including the cyan, magenta, yellow, and black document images, sequentially or partially in parallel. Alternatively, a conceal pattern P may be added only to the black document image.

In this example, as illustrated in FIG. 5, Step S400 is performed at a detection time point L1, which occurs after a first time period T1, counted from Step S110 of inputting the document image, passes. Step S500 is performed at an addition time point L2, which occurs after a second time period T2, counted from Step S110 of inputting the document image, passes.

The amount of information to be concealed may differ depending on the first time period T1 or the second time period T2. In one example, the amount of information to be concealed may be increased if the first time period T1 is reduced by placing the detection time point L1 early in the operation. In another example, the amount of information to be concealed may be increased if the second time period T2 is increased by placing the addition time point L2 later in the operation.

Further, the overall processing speed may differ depending on the first time period T1 or the second time period T2. In one example, the processing speed may be increased if the first time period T1 is reduced by placing the detection time point L1 early in the operation. In another example, the processing speed may be reduced if the second time period T2 is increased by placing the addition time point L2 later in the operation.

Numerous additional modifications and variations are possible in light of the above teachings. It is therefore to be understood that within the scope of the appended claims, the disclosure of this patent specification may be practiced in ways other than those specifically described herein.

For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

What is claimed is:

1. An image processing apparatus, comprising:
an input device configured to obtain a document image and to apply input processing to the document image;
a common image processor configured to apply common image processing to the document image processed by the input device;
a specific image processor configured to apply specific image processing to the document image processed by the common image processor;
an output device configured to apply output processing to the document image processed by the specific image processor;
a detector configured to detect whether the document image is copy guarded at a detection time point to generate a detection result; and
a processor configured to select an application of the document image from a plurality of applications according to a user instruction as a selected application, to determine the detection time point based on the selected application, and to cause the detector to detect whether the document image is copy guarded at the determined detection time point.

2. The apparatus of claim 1, wherein the detection time point occurs after the input processing is applied to the document image and before the specific image processing is applied to the document image.

3. The apparatus of claim 1, wherein the detection result indicates whether the document image includes a copy guard pattern.

4. The apparatus of claim 1, further comprising:
a concealer configured to add a conceal pattern to the document image at an addition time point based on the detection result; wherein:
the processor is further configured to determine the addition time point based on the selected application, and to cause the concealer to add the conceal pattern at the determined addition time point.

5. The apparatus of claim 4, wherein the addition time point occurs before the output processing is applied to the document image.

6. The apparatus of claim 5, wherein the addition time point occurs after the common image processing is applied to the document image.

7. The apparatus of claim 6, wherein the detection performed by the detector is synchronous to the input processing performed by the input device, and wherein the output processing performed by the output device is asynchronous to the input processing performed by the input device.

8. The apparatus of claim 6, wherein the addition of the conceal pattern performed by the concealer is synchronous to the input processing performed by the input device, and wherein the output processing performed by the output device is asynchronous to the input processing performed by the input device.

9. The apparatus of claim 6, wherein at least one of the specific image processing and the outputting processing corresponds to the selected application of the document image.

10. The apparatus of claim 6, wherein the conceal pattern is selected from a plurality of conceal patterns based on the selected application of the document image.

11. The apparatus of claim 4, wherein the processor is further configured to determine at least one of the detection time point and the addition time point based on a desired processing speed of the image processing apparatus.

12. The apparatus of claim 4, wherein the processor is further configured to determine at least one of the detection time point and the addition time point based on a desired amount of information to be concealed by the conceal pattern.

13. The apparatus of claim 1, wherein the detection result is provided to the concealer via the processor.

14. The apparatus of claim 1, further comprising:
a storage device configured to store the plurality of applications, each application causing the document image to be output in a specific format.

15. An information processing apparatus, comprising:
a storage device configured to store a plurality of applications, each application causing a document image to be output in a specific format;
a processor configured to analyze a user instruction and to select an application from the plurality of applications according to a user instruction as a selected application; and
a storage device configured to store a plurality of instructions which, when activated by the processor, causes the processor to perform at least one function of a plurality of functions according to the user instruction, the functions comprising:
inputting a document image;
applying common image processing to the document image;
applying specific image processing to the document image;
outputting the document image; and
detecting whether the document image is copy guarded at a detection time point to generate a detection result, wherein the processor is further configured to determine the detection time point based on the selected application, and to cause the function of detecting whether the document image is copy guarded to be performed at the determined detection time point.

16. The apparatus of claim 15, wherein the functions further comprises:
adding a copy guard pattern to the document image based on the detection result at an addition time point,
wherein the processor is further configured to determine the addition time point based on the selected application, and to cause the function of adding the copy guard pattern to be performed at the determined addition time point.

17. The apparatus of claim 16, wherein the processor comprises:
a first processor configured to control information to be processed by the apparatus, the information including the user instruction;
a second processor configured to allow the apparatus to concurrently perform more than one of the functions, the functions at least including the function of detecting; and
a third processor configured to allow the apparatus to perform more than one of the functions, the functions at least including the function of applying common image processing and the function of applying specific image processing.

18. The apparatus of claim 17, further comprising:
an input device configured to obtain the document image.

19. The apparatus of claim 18, further comprising:
an output device configured to output the document image in the specific format determined by the selected application that is selected by the processor according to the user instruction.

20. The apparatus of claim 16, wherein the conceal pattern conceals information contained in the document image when the document image is output, and wherein the processor is further configured to control the amount of information to be concealed through at least one of the detection time point and the addition time point.

21. A method for processing a document image using an image processing apparatus, the method comprising the steps of:
selecting an application of a document image from a plurality of applications according to a user instruction as a selected application;
determining a detection time point based on the selected application;
inputting the document image;
first applying common image processing to the document image;
second applying specific image processing to the document image;
outputting the document image in a specific format determined by the selected application; and
detecting whether the document image is copy guarded at the detection time point determined by the determining step to generate a detection result.

22. The method of claim 21, further comprising the step of:
determining an addition time point based on the selected application;
adding a conceal pattern to the document image at the addition time point determined by the determining step based on the detection result.

23. The method of claim 22, further comprising:
controlling an amount of information to be concealed by the conceal pattern through at least one of the detection time point and the addition time point.

24. The method of claim 22, further comprising: controlling the processing speed of the image processing apparatus through at least one of the detection time point and the addition time point.

25. A computer readable medium storing computer instructions for performing an image processing operation comprising the steps of:
selecting an application of a document image from a plurality of applications according to a user instruction as a selected application;
determining a detection time point based on the selected application;
inputting the document image;
first applying common image processing to the document image;
second applying specific image processing to the document image;
outputting the document image in a specific format determined by the selected application; and
detecting whether the document image is copy guarded at the detection time point determined by the determining step to generate a detection result.

26. The medium of claim 25, wherein the operation further comprises the step of:
determining an addition time point based on the selected application;
adding a conceal pattern to the document image at the addition time point determined by the determining step based on the detection result.

* * * * *

UNITED STATES PATENT AND TRADEMARK OFFICE
CERTIFICATE OF CORRECTION

PATENT NO. : 7,599,081 B2  Page 1 of 1
APPLICATION NO. : 11/298615
DATED : October 6, 2009
INVENTOR(S) : Shimura et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 883 days.

Signed and Sealed this

Twenty-eighth Day of September, 2010

David J. Kappos
*Director of the United States Patent and Trademark Office*